United States Patent Office 3,488,309
Patented Jan. 6, 1970

3,488,309
SYNTHETIC RUBBER LATICES
Ernest Gordon Cockbain, Welwyn Garden City, England, assignor to The Natural Rubber Producers' Research Association, London, England
No Drawing. Filed Mar. 29, 1967, Ser. No. 626,705
Claims priority, application Great Britain, Mar. 30, 1966, 14,189/66
Int. Cl. C08d 7/10
U.S. Cl. 260—23.7         5 Claims

ABSTRACT OF THE DISCLOSURE

The freeze-thaw stability of synthetic latices based on polychlorobutadiene and butadiene/styrene copolymers containing at least 60% by weight of butadiene is improved by the addition to the latex of about 0.05 to 1% by weight of water-soluble salicylates particularly the sodium, potassium salicylates.

---

This invention is for improvements in or relating to synthetic rubber latices and has for an object to provide synthetic rubber latices having an improved freeze-thaw stability and a process for producing such stabilised latices.

It is well known that many aqueous dispersions and emusions of both natural and synthetic products tend to decrease in colloidal stability if subjected to temperatures varying above and below their freezing point. This decrease in stability usually manifests itself by an increase in the viscosity of the system or by flocculation or coagulation of the disperse phase. These remarks apply to many synthetic polymer latices. The reasons for such behaviour are complicated and are still not well understood. But the stability of a synthetic polymer latex to freezing and thawing, i.e. its "freeze-thaw" stability, does appear to depend on many factors, including the concentration and chemical composition of the polymer and the concentration and type of surface active agents which are present in the latex. Improvements in the freeze-thaw stability of a given synthetic polymer latex can sometimes be achieved by the further addition of surface active agents to the latex, but this is liable to cause changes in other properties of the latex which may be undesirable, e.g. an increased frothing tendency.

We have now found that the freeze-thaw stability of latices of certain synthetic polymers is improved by the addition of small amounts of water-soluble salicylic acid salts. The synthetic polymers referred to here are poly-2-chlorobutadiene and rubbery copolymers of butadiene with styrene in which the proportion of butadiene (by weight) is not less than 60%. A considerable number of such polymers are now manufactured and sold in latex form and their freeze-thaw stabilities show variations depending upon the details of their composition.

According to the present invention, therefore, there is provided a synthetic latex having as the disperse phase a rubbery polymer of 2-chlorobutadiene or a rubbery copolymer of butadiene with styrene containing at least 60% by weight of butadiene which contains as a freeze-thaw stabiliser a small amount of a water-soluble salt of salicylic acid. The invention also includes a process for the production of the synthetic latices above described which comprises adding to an aqueous dispersion of the above-mentioned polymer or copolymers a water-soluble salt of salicylic acid. As might be expected, the increase in freeze-thaw stability of a latex caused by addition of a water-soluble salicylic acid salt is usually most marked when the initial freeze-thaw stability of the latex is low.

The water-soluble salicylic acid salts we prefer to use are the sodium, potassium and ammonium salts. Concentrations of the salt should preferably be in the range 0.05% to 1.0% by weight of the latex.

The foregoing statement that the addition of further surface-active agents, e.g. soaps, to a latex may sometimes be undesirable because of the effect of soaps on the degree of frothing of the latex when agitated does not apply to salicylic acid salts used in accordance with the present invention which have very little tendency to cause frothing. This is an important advantage of the use of salicylic acid salts in cases where increased frothing or other manifestations of increased surface activity are undesirable. Nevertheless, in the process of our invention, besides, the addition of salicylate there may be added to the latex, if it is desired, from 0.002% to 0.3% by weight of a surface active agent such as the sodium, potassium or ammonium salt of a long chain fatty acid, e.g. ammonium laurate or potassium oleate.

The following examples, in which percentages and parts are given by weight, will serve to illustrate the manner in which the invention may be carried into effect.

EXAMPLE I

To 100 lbs. of poly-2-chlorobutadiene (polychloroprene) latex, sold under the registered trademark "Neoprene" Latex Type 650, was added 5 lbs. of a 10% aqueous solution of sodium salicylate. To another 100 lbs. of the same latex was added 5 lbs. of water; this latex served as a control. After storing the latices at —15° C. for 48 hours and then thawing at 25° C. the one containing sodium salicylate was still fluid, whereas the control sample had set irreversibly to a gel.

The two latices described in Eaxmple I were also stored at —26° C. for 24 hours and then thawed at 25° C. Again the latex containing sodium salicylate was fluid, whereas the control sample had set to an irrevrsible gel.

EXAMPLE II

To 100 lbs. of a latex of a copolymer of butadiene (70 parts) and styrene (30 parts), sold under the registered trademark "Pliolite" 5352, was added 3 lbs. of a 10% aqueous solution of sodium salicylate. To another 100 lbs. of the latex was added 3 lbs. of water, this latex serving as a control. After being held at —26° C. for 4 days and then thawing at 25° C. the latex containing sodium salicylate was still fluid, whereas the control latex had set irreversibly to a gel.

EXAMPLE III

To 100 lbs. of the copolymer latex described in Example II was added 5 lbs. of a 10% aqueous solution of sodium salicylate. To a further 100 lbs. of the latex was added 5 lbs. of water. Both latices were then held at —26° C., the one containing sodium salicylate for 7 days and the control sample for only 1 day. After thawing at 25° C. the latex which contained sodium salicylate and which had been frozen for 7 days was still fluid, whereas the control sample had set to a permanent gel although it had been held in the frozen state for as short a period as 1 day.

I claim:
1. In synthetic latex having as the disperse phase a rubbery polymer of the class consisting of poly-2-chlorobutadiene and rubbery copolymers of butadiene with styrene containing at leaset 60% by weight of butadiene, the improvement according to which the latex contains an effective amount of a water-soluble salt of salicylic acid as a freeze-thaw stabiliser

2. A synthetic latex according to claim 1 wherein the said water-soluble salt is sodium, potassium or ammonium salicylate.

3. A synthetic latex according to claim 1 wherein the salicylic acid salt is used in an amount of from 0.05% to 1.0% by weight of the latex.

4. A synthetic latex according to claim 1 wherein an additional surface-active agent is incorporated into said latex in an amount of from 0.02% to 0.3% by weight thereof.

5. A synthetic latex according to claim 4 wherein said additional surface-active agent is the sodium, potassium or ammonium salt of a long-chain fatty acid.

References Cited

UNITED STATES PATENTS

| | | | |
|---|---|---|---|
| 1,729,522 | 9/1929 | Scholz | 260—815 |
| 2,580,040 | 12/1951 | Munsell | 260—8 |
| 2,773,849 | 12/1956 | Willis | 260—29.7 |

DONALD E. CZAJA, Primary Examiner

D. J. BARRACK, Assistant Examiner

U.S. Cl. X.R.

260—29.7, 31.2